United States Patent
Lang et al.

[11] Patent Number: 6,158,718
[45] Date of Patent: Dec. 12, 2000

[54] GATE VALVE

[75] Inventors: Heinrich H. Lang, The Woodlands; F. Jeffery Lane, Houston, both of Tex.

[73] Assignee: ERC Industries, Inc., Houston, Tex.

[21] Appl. No.: 09/398,976

[22] Filed: Sep. 17, 1999

[51] Int. Cl.[7] .................................................. F61K 25/00
[52] U.S. Cl. .......................................... 251/167; 251/195
[58] Field of Search .................................. 251/156, 167, 251/193, 195, 199, 203

[56] References Cited

U.S. PATENT DOCUMENTS

| | | | |
|---|---|---|---|
| 2,869,819 | 1/1959 | Rucker | 251/199 |
| 4,188,014 | 2/1980 | Alvarez | 251/199 X |
| 4,189,127 | 2/1980 | Constantino | 251/199 X |
| 4,487,393 | 12/1984 | Eagen | 251/195 X |
| 4,489,918 | 12/1984 | Kalsi | 251/195 X |
| 4,535,967 | 8/1985 | Babbitt et al. | 251/193 X |

OTHER PUBLICATIONS

WGPC SureSeal Model 2100 Gate Valve Catalog p. 30.
WGPC SureSeal Model 2000 Gave Valve Catalog p. 28.
ABB Vetco Gray Model "D" Drawing.

*Primary Examiner*—Kevin Shaver
*Assistant Examiner*—Eric Keasel
*Attorney, Agent, or Firm*—Head, Johnson & Kachigian

[57] ABSTRACT

An improved gate valve having a body with horizontal inlet and outlet fluid flow passageways with first and a second seat surrounding the passageways, a stem supported in a vertical plane by the body, a gate positioned between the seats and being vertically displaceable by the stem between an upper valve open position and a downward valve closed position, the gate being formed by a first and a second segment, each segment having an internal face inclined at an angle to a vertical plane and an outer planar sealing face, the outer sealing faces being paralleled to each other, each segment having in a lower portion an opening therethrough, the openings in the segments being aligned with the body fluid flow passageways when the gate is in the upper, open position and out of alignment with the fluid flow passageways when the gate is in the lower, closed position. The inclined surfaces are vertically displaced with respect to each other when the gate is moved downwardly to the closed position forcing the segments outer sealing faces away from each other and into sealed engagement with the seats, closing flow through the fluid flow passageways and the inclined surfaces being vertically displaced with respect to each other when the gate is moved upwardly to the open position allowing the segments outer sealing faces to move towards each other thereby reducing the force required to move the gate to the open position.

13 Claims, 6 Drawing Sheets

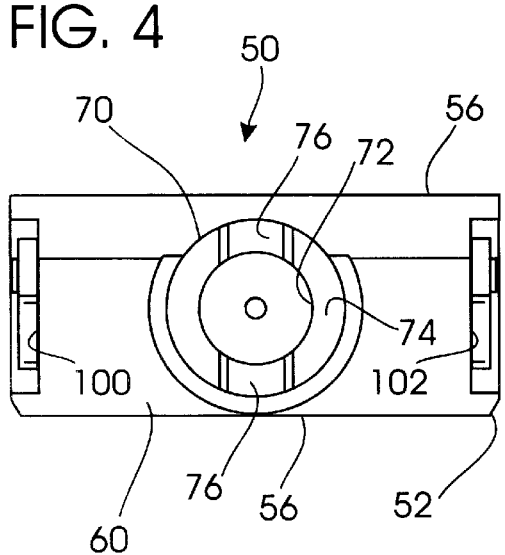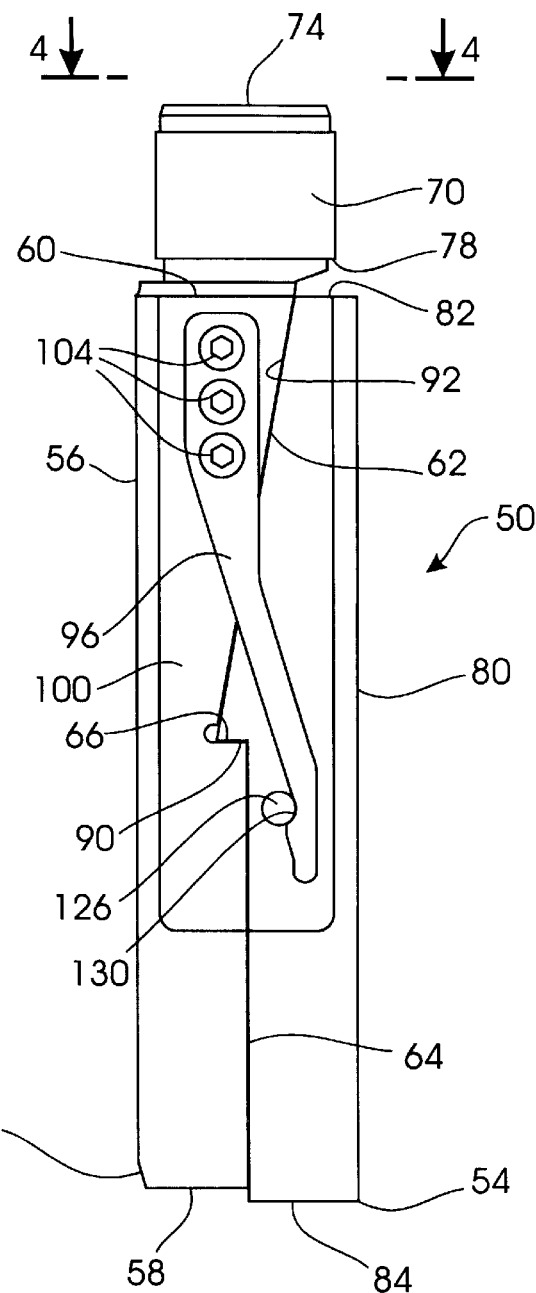

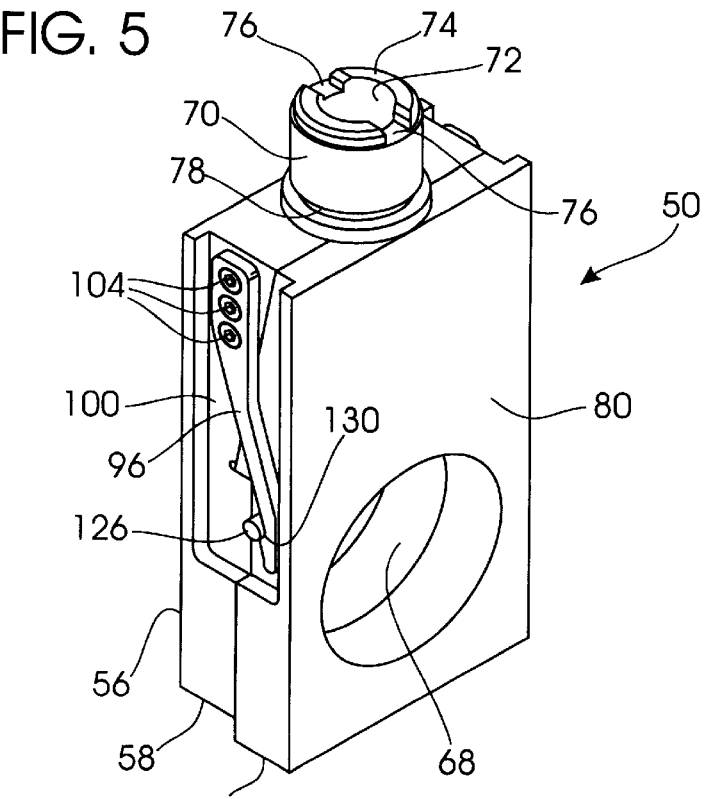
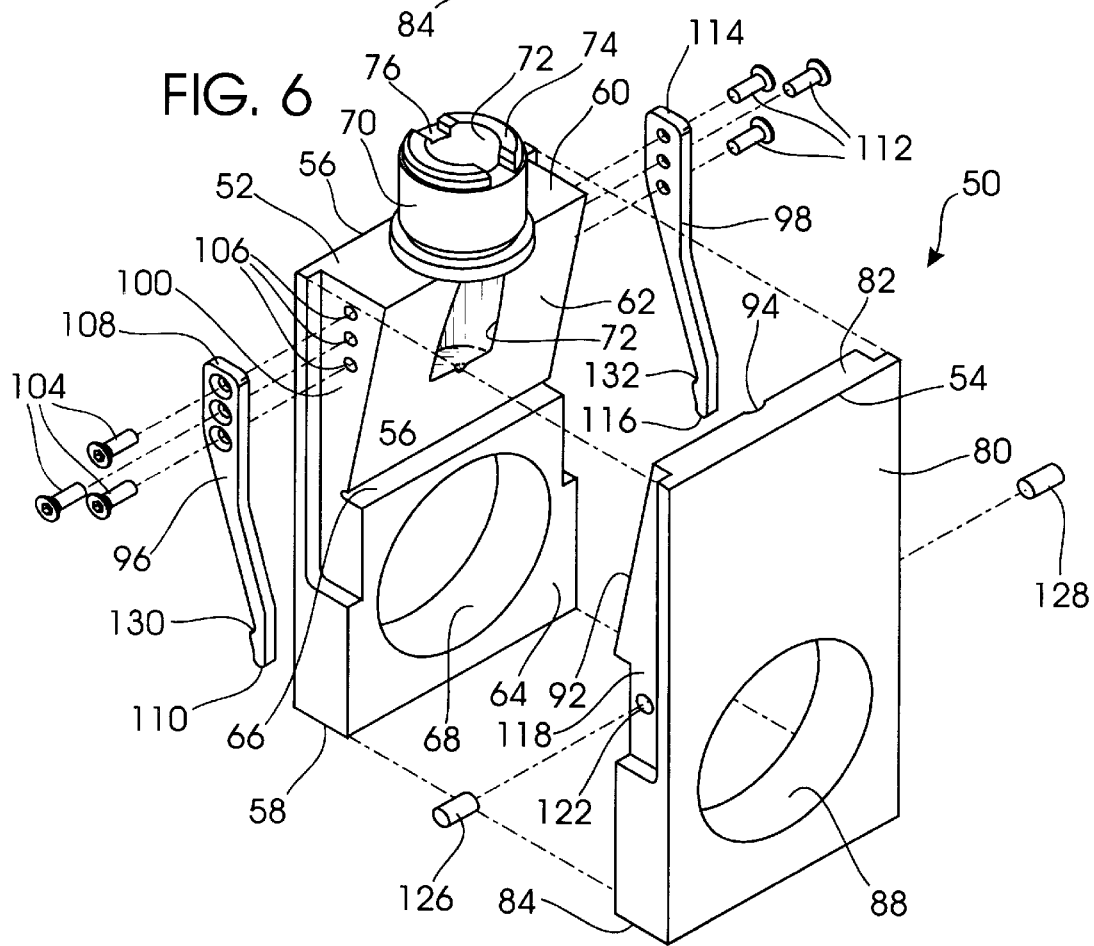

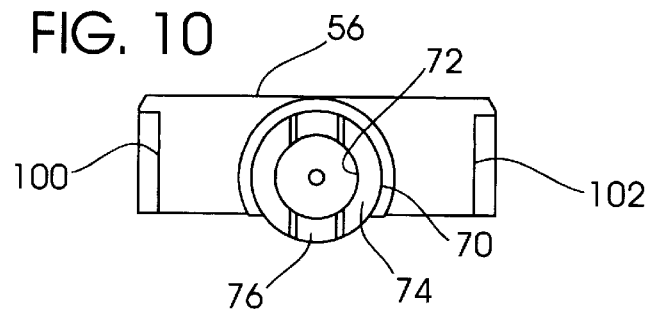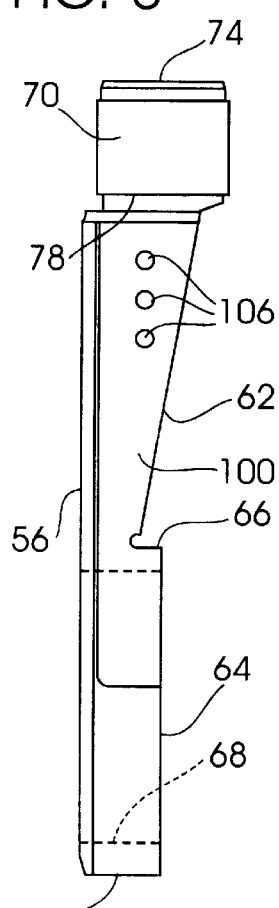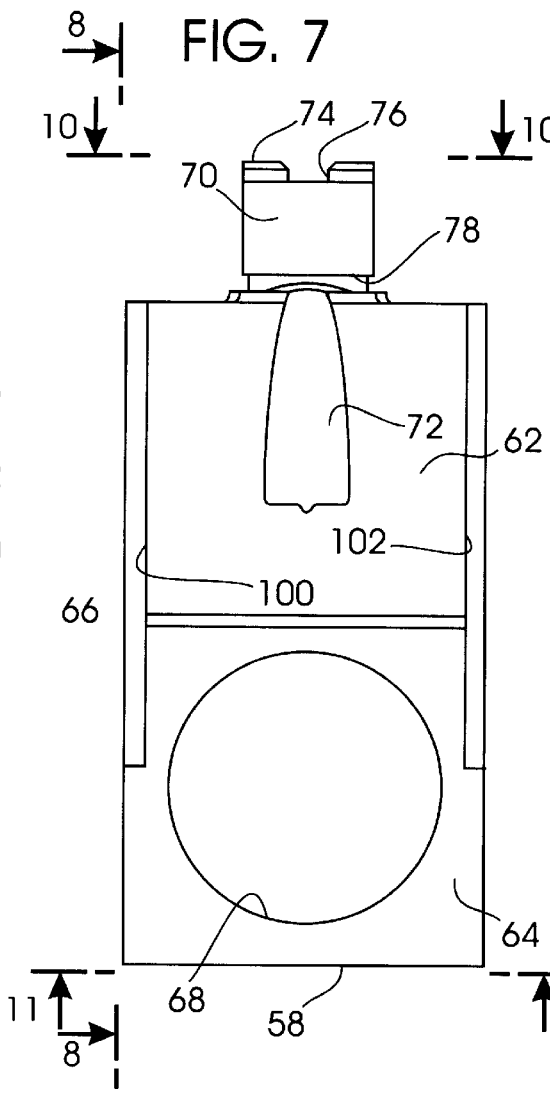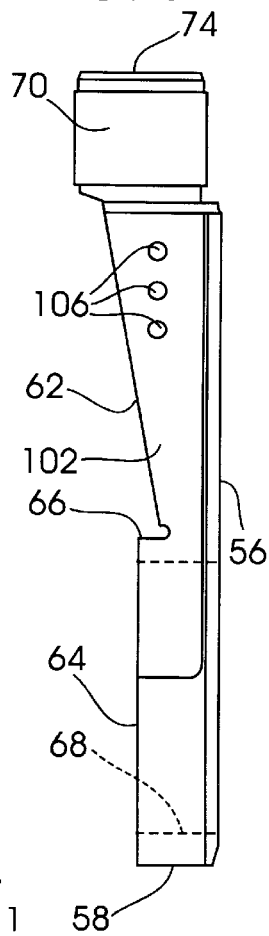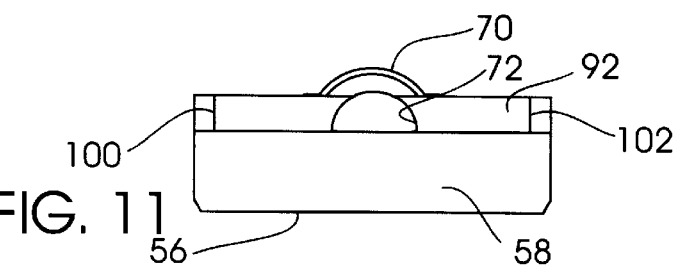

GATE VALVE

REFERENCE TO PENDING APPLICATIONS

This application is not related to any pending United States or international patent application.

REFERENCE TO MICROFICHE APPENDIX

This application is not referenced in any Microfiche Appendix.

BACKGROUND OF THE INVENTION

Many types of valves exist for industrial application including ball valves, globe valves, butterfly valves, plug valves and so forth but a type of valve that has been universally popular, particularly for heavy duty industrial and high pressure applications in oil and gas fields, chemical plants, refineries, and so forth is known generally as a "gate valve". Gate valves traditionally function by moving a gate that is slidably positioned between an upstream and a downstream valve seat within a valve body, the gate having in one position an opening through it that, when aligned with a flow passageway through the valve body, permits fluid flow and the gate having in another portion a solid surface that prohibits fluid flow. Thus, it is called a gate valve since the gate can be opened or closed to allow flow or prohibit flow.

A basic gate valve employs a gate member that is of uniform thickness and slides between an inlet and an outlet valve seat. As long as a close tolerance is maintained in the spacing between the valve seats and the thickness of the gate then functions satisfactorily. As wear occurs, leakage through the gate valve can take place. A more refined gate valve is a type that compensates for wear and manufacturing tolerances and has provision for controlling the width or thickness of the gate as it seals between an opposed inlet passageway surrounded by an inlet valve seat and an outlet passageway surrounded by an outlet valve seat. That is, improved gate valves are designed so that in the closed position the thickness of the gate is automatically increased to more effectively seal the passageway through the valve body.

One type of improved gate valve has a gate that is moved vertically between open and closed positions, the gate being between opposed inlet and outlet seals surrounding inlet and outlet passageways. The gate is bifurcated having a first portion with a planar outer surface and a concave inner surface. The other half of the bifurcated gate has a planar outer and a convex inner surface. The second half of the gate is free to displace within limits as confined by the concave/convex interrelationship. This type of valve expands in both the fully open and fully closed positions. That is, as a first bifurcated half of the gate is moved vertically in one direction, the gate width is expanded and when moved vertically in the opposite direction the gate width is also expanded. This design has a potentially serious problem with wedging action in the upward, that is the open position of the gate due to high opening torques. In contrast, the valve of this invention has an improved gate design to cause the gate to wedge only in the valve closed position and the gate to contract in width as the gate is moved to the open position to thereby substantially reduce opening torque.

BRIEF SUMMARY OF THE INVENTION

This invention provides an improved gate valve and more specifically an improved gate for use in a gate valve.

The improved gate valve includes a body having horizontal inlet and outlet fluid flow passageways that are coaxial and that intersect a valve body cavity. A first annular seat is positioned in the body cavity surrounding the inlet fluid flow passageway, and in like manner, an opposed second or outlet valve seat is positioned in the body cavity surrounding the outlet fluid flow passageway. The inlet and outlet valve seats have sealing surfaces that are paralleled to each other. The terms "inlet" and "outlet" to identify the flow passageways are for convenience only since the valve of this invention is, in all respects, bi-directional.

A vertical stem is rotatably supported by a bonnet that is attached to the valve body. The stem extends downwardly into the body cavity. Exterior of the valve bonnet there is provision for rotating the stem, either manually or by a valve actuator to move the valve between open and closed positions. A gate is positioned within the valve body between the first and second seats. The gate is vertically displaceable by action of the valve stem between an upper valve open position and a downward valve closed position. The gate is formed of first and second segments. Each segment has an internal and an external face. The external face of each of the first and second segments is planar, or at least substantially planar and is configured to engage a valve seat sealing surface.

Each of the gate segments has a lower portion having an opening therethrough, the openings in the segments being aligned with the body fluid flow passageways when the gate is in an upper, open position. The openings in the segments are out of alignment with the body fluid flow passageways when the gate is in a lower, closed position.

Formed on an inner surface of the first segment approximately midway between the bottom and the upper end of the first segment is a horizontal ledge. The top portion of the inner surface of the first segment above the horizontal ledge is inclined upwardly and outwardly with respect to the first segment sealing face. The first segment of the gate is attached for vertical displacement by the valve stem.

The inner surface of the second segment has, intermediate the top and bottom end thereof, a horizontal ledge. The ledge of the second segment is juxtaposed to and overlaps the horizontal ledge of the first segment.

The second segment inner surface, above the horizontal ledge, is inclined upwardly and inwardly with respect to the second segment sealing face. The gate second segment is mated with and moved by the first segment with the first segment contacting the second segment ledge when the gate is moved in an upward direction by which the second segment is vertically positioned. The segments are spread apart by the sliding relationship of the incline surfaces when the gate is forced to a downward position by the stem. More specifically, downward displacement forces the second segment to slidably displace relative to the first segment to force the first segment sealing face into sealed contact with the first valve seat and the second segment sealing face into sealed contact with the second valve seat.

When the gate first segment is upwardly displaced towards the valve open position by the valve stem the inclined surfaces between the two valve segments displace with respect to each other allowing the width of the gate to diminish, permitting the gate to be moved with relatively little torque from the closed to the open position.

Cantilevered springs are employed to constantly urge the gate segments towards each other. Each spring is affixed at one end to a side edge of one segment and extends to engage, at its outer cantilevered end, a pin extending from the other segment. The springs serve to reduce the settlement of contaminants such as sand, mud, etc. between the segments during operation of the valve.

A better understanding of the invention will be obtained from the following detailed description of the preferred embodiment, taken in conjunction with the attached drawings.

DESCRIPTION OF THE DRAWINGS

FIG. 1 shows the valve and the gate in the opened position that is, where fluid flow passageways through the valve are fully open.

FIG. 3 is an elevational enlarged external view of the gate assembly as employed in the valve of FIGS. 1 and 2.

FIG. 4 is a top plan view of the gate assembly taken along the line 4—4 of FIG. 3.

FIG. 5 is an isometrical elevational view of the gate assembly of FIGS. 3 and 4.

FIG. 6 is an exploded view of the gate assembly as employed in the improved valve.

FIG. 7 is an elevational view of the inner surface of the first gate segment.

FIG. 8 is an elevational side view taken along the line 8—8 of FIG. 7 of the first gate segment.

FIG. 9 is an elevational side view of the opposed side of the first gate segment taken along the line 9—9 of FIG. 7.

FIG. 10 is a top view of the first gate element as taken along the line 10—10 of FIG. 7.

FIG. 11 is a bottom view of the first gate segment taken along the line 11—11 of FIG. 7.

DETAILED DESCRIPTION OF A PREFERRED EMBODIMENT

Figure 1:
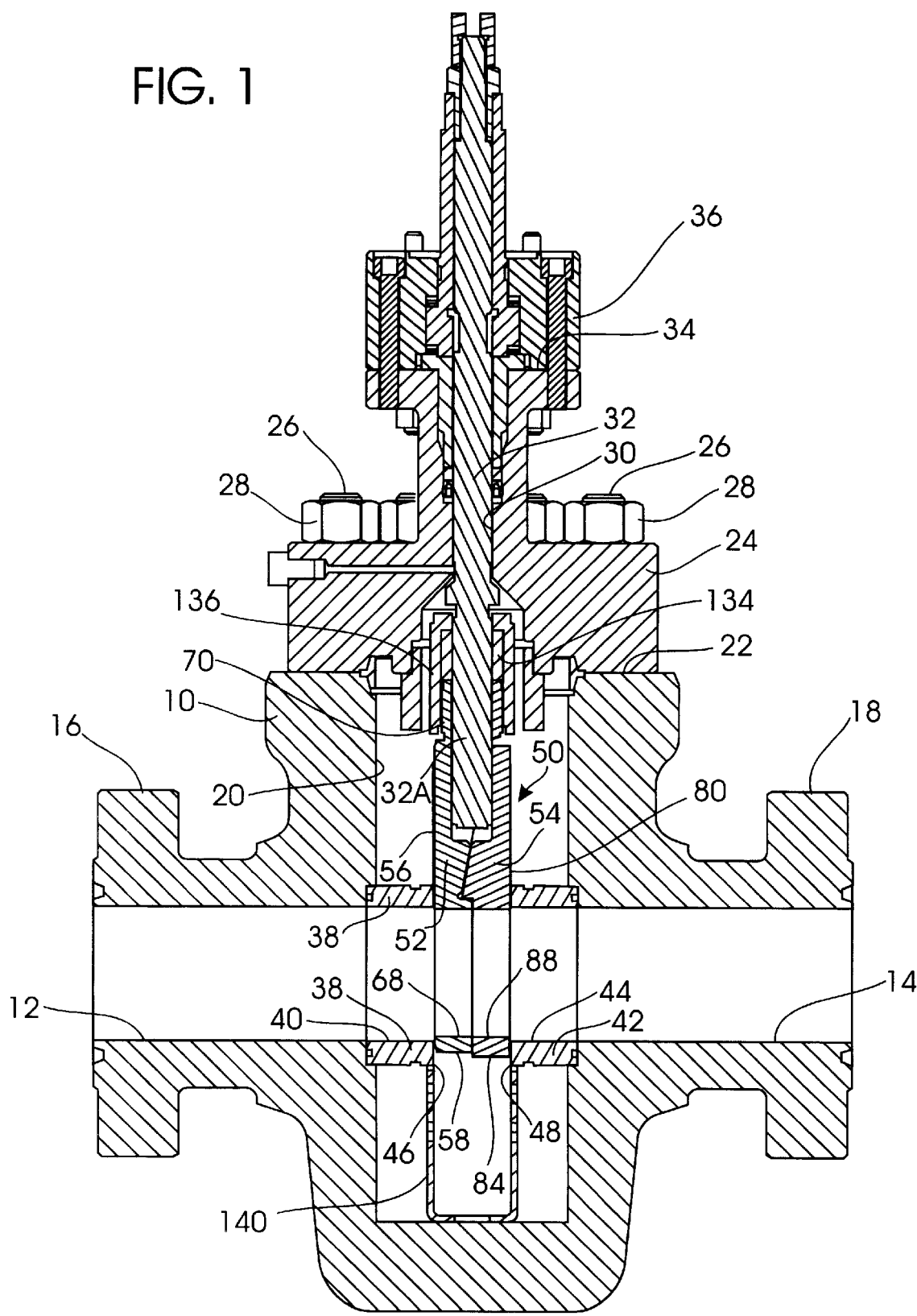
FIG. 1 is an elevational cross-sectional view of an improved gate valve of this invention and most specifically, an improved gate for use in a gate valve.

Referring to the drawings and first to FIG. 1 an elevational cross-sectional view of a valve that incorporates the principles of this invention as shown. The gate valve of this invention includes a body 10 that may be made cast or fabricated of steel or other metals. The body 10 is typical of valve bodies of known types of gate valves and includes an inlet fluid passageway 12 and an outlet fluid passageway 14, the passageways 12 and 14 being coaxial. The valve body 10 is shown to have an integrally formed flange 16 surrounding inlet fluid passageway 12 and an integral flange 18 surrounding outlet fluid passageway 14 the flanges providing means by which piping or other fluid handling components may be attached to the valve. The use of flanges is by example only as the valve can include threaded fittings or other provisions for coupling to fluid handling equipment.

Formed within valve body 10 is a vertically oriented body cavity 20 with which fluid flow passageways 12 and 14 intersect. Body 10 has a top surface 22 at which is secured a valve bonnet 24, held in place by bolts 26 and nuts 28. Bonnet 24 has an opening 30 therein that rotatably receives a valve stem 32.

Affixed to an upper surface 34 of a bonnet 24 is a bearing retainer 36 that rotatably receives valve stem 30. Bearing retainer 36 includes provisions for supporting valve stem 32 in a manner to permit its rotation but to resist axial displacement. Bonnet 24 and bearing retainer 36 are components frequently employed with gate valves and are not directly related to the improvements which constitutes the invention of this disclosure but are illustrated and described only to give a general background to which the invention is applicable. It is understood that in the practice of the invention the shape and configuration of valve body 10, bonnet 24, bearing retainer 36 and so forth can vary considerably and may have physical appearances that are completely unlike that illustrated in the drawings but which accomplishes the purpose of the illustrated components.

Positioned within body cavity 20 is a first annular valve seat 38 having a passageway 40 therethrough that coincides with and is an extension of the valve body first inlet fluid passageway 12. Opposed to and in alignment with the first valve seat is a second valve seat 42 having a flow passageway 44 that is coincident with the valve body outlet fluid passageway 14. Valve seats 38 and 42 are illustrated to be of the removable kind, that is, they are removably positioned within recesses in valve body 10—a procedure frequently employed in the industry although it is understood that the valve seats could be integrally formed as a part of the valve body 10. First valve seat 38 has a sealing face 46 and in like manner, second valve seat 42 has a sealing face 48.

Vertically positioned within valve body cavity 20 between valve seats 38 and 42 is a valve gate generally indicated by the numeral 50. The unique concept embodied in gate 50 represents the critical innovative features of the invention and are best seen in FIGS. 3–16. Referring first specifically to FIGS. 3–6 the valve gate 50 includes, as essential components, a first vertical segment 52 and a second vertical segment 54. First segment 52 is generally rectangular and vertical and has an outer substantially planer first segment sealing face 56, a bottom end 58 and a top end 60. Opposed to first segment sealing face 56 is an inner surface divided into an upper portion 62 and a lower portion 64, the upper and lower portions being separated by a first segment horizontal ledge 66.

The first segment inner surface upper portion 62 is inclined upwardly with respect to horizontal ledge 66 and outwardly with respect to the first segment sealing face 56. The first segment inner surface lower portion 64 is vertically planar. A flow passageway 68 is formed through the lower portion of first segment 52, the diameter of flow passageway 68 preferably being substantially identical to the internal diameter of flow passageway 40 through first valve seat 38 as seen in FIG. 1.

Integrally formed as a part of first segment 52 is an upstanding tubular attachment portion 70 having a vertical opening 72 therein that extends downwardly past first segment top end 60 and is exposed in the first segment inner surface upper portion 62 as clearly seen in FIG. 6. Attachment portion 72 has a top end 74 having a horizontal notch 76 therein, the purpose of which will be described subsequently. A circumferential recess 78 is used in the attachment of gate first segment 52 to a lift nut as will be described subsequently by which the gate is vertically positioned upon rotation of valve stem 32.

Figure 13:
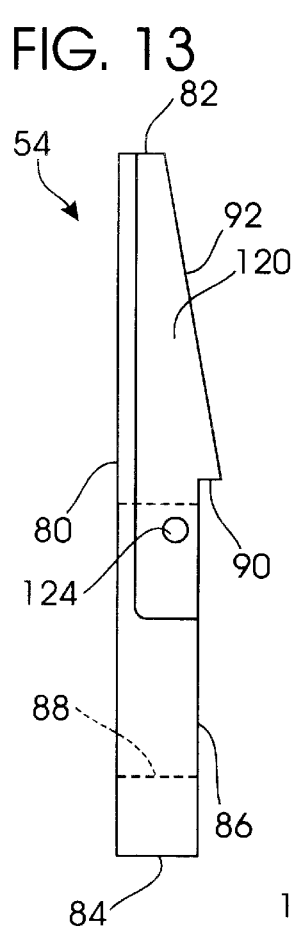
FIG. 13 is an elevational view of one side of the second gate segment as taken along the line 13—13 of FIG. 12.
Figure 12:
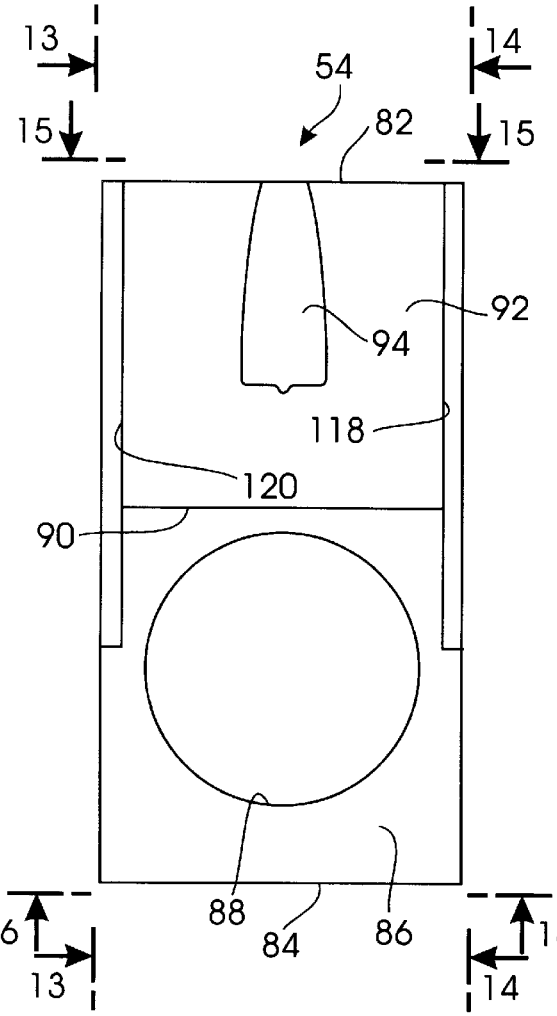
FIG. 12 is an elevational view of the inner surface of the second gate segment.
Figure 14:
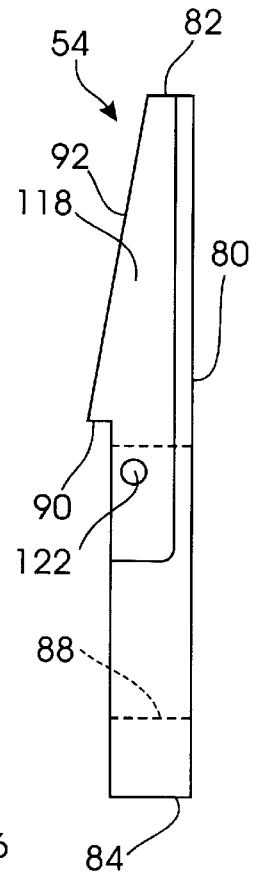
FIG. 14 is an elevational view of the opposite side of the second gate segment taken along the line 14—14 of FIG. 12.
Figure 16:
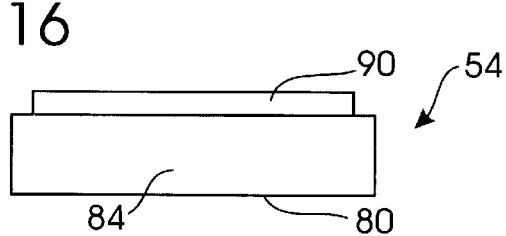
FIG. 16 is a bottom plan view of the second gate segment taken along the line 16—16 of FIG. 12.

Second gate segment 54 has a planar vertical sealing face 80 that is paralleled to sealing face 56 of first segment 52. The second segment has a top end 82 and bottom end 84. The inner surface of second segment 54 as best seen in FIGS. 12, 13 and 14 includes a lower vertical portion 86 that has a flow passageway 88 therethrough that is in alignment or at least substantial alignment with flow passageway 68 in first segment 52. The diameter of flow passageway 88 is preferably substantially equal to the diameter of the flow passageway 44 through second valve seat 42 as seen in FIG. 1.

Second gate segment 54 has a horizontal ledge 90 that separates the lower portion 86 of the second segment inner surface with an upper portion 92, the upper portion being planar and inclined upwardly and inwardly with respect to second segment sealing face 80. Second segment inner surface upper portion 92 is configured to match and slidably engage the first segment inner surface upper portion 62. The second segment inner surface upper portion 92 has a recess 94 therein that mates with recess 72 in the first segment, the recesses 72 and 94 being a continuation of the vertical opening 72 in the first segment attachment portion 70 that receives the lower end of valve stem 32 during actuation of the valve.

The valve gate second segment 54 is not directly attached to valve stem 32 but instead floats within body cavity 20 in contact with sealing surface 48 of second valve seat 42, the vertical position of valve seat second segment 54 being controlled entirely by its interrelationship with gate first segment 52. To maintain second segment 54 in contact with first segment 52 and specifically to maintain the second segment inner surface in contact with the first segment inner surface, cantilevered springs are employed. Specifically, first cantilevered spring 96 and a second cantilevered spring 98 are seen best in FIGS. 3, 5 and 6. First gate segment 52 has in one side surface thereof a recessed side portion 100 and an opposite recess side surface 102, these side surfaces being seen in FIGS. 7, 8 and 9. Spring 96 is positioned in first side surface 100 and held in place by three bolts 104 that fit through openings in spring 96 and are received in threaded openings 106 in the first recess side surface 100. Bolts 104 securely hold a first end 108 of cantilevered spring 96 securely in position allowing a second end 110 to flex.

Second spring 98 that is affixed to the second recessed side surface 102 of first segment 52 is, in like manner, held in position by bolts 112 extending through openings in the spring. Thus, a first end 114 of spring 98 is held secure while the second end 116 is free to flex.

As seen in FIGS. 12–16, gate second segment 54 includes opposed recessed side surfaces 118 and 120 that receive cantilevered springs 96 and 98 respectively. An opening 122 is formed in second segment recess side surface 118 and in like manner, an opening 124 is formed in the other recess side surface 120 of the second segment. Positioned in opening 122 is a pin 126 and received in opening 124 is a pin 128, the pins being seen in FIG. 6.

Cantilevered springs 96 has adjacent outer end 110, an enlarged width portion providing a hook recess 130. Spring 98 has the same shaped hook recess 132. In their assembled positions, as seen in FIGS. 3, 4, and 5 the inner surfaces of gate segments 52 and 54 are held in a contiguous but slidable relationship by cantilevered springs 96 and 98. Springs 96 and 98 ensure the movement of gate second segment 54 as first segment 52 is moved vertically while nevertheless providing for a slidable relationship between the two. Hook recesses 130 and 132 of springs 96 and 98 serve to engage pins 126 and 128 to limit and control the slidable relationship between segments 52 and 54.

Figure 2:
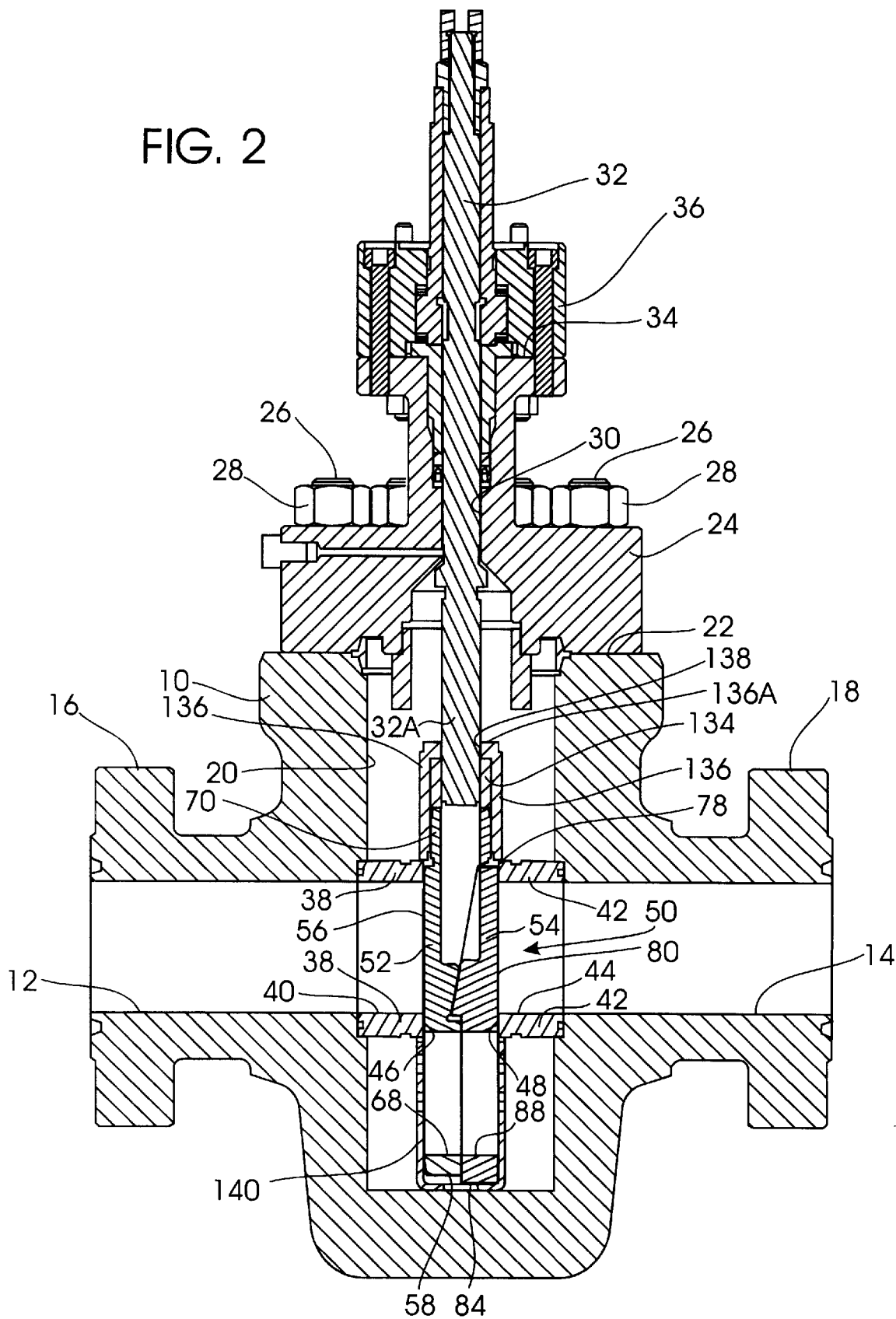
FIG. 2 is an elevational cross-sectional view of the valve as in FIG. 1 but showing the valve in the fully closed position in which fluid flow through the valve is blocked.
Figure 15:
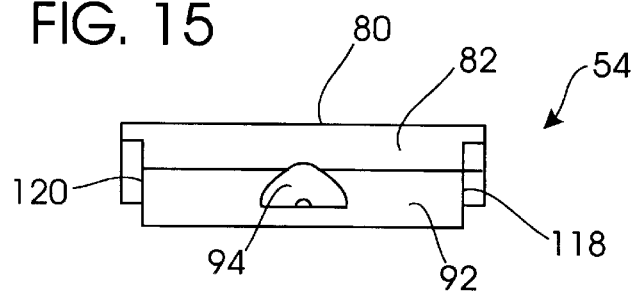
FIG. 15 is a top plan view of the second gate segment taken along the line 15—15 of FIG. 12.

As was previously stated, the vertical position of gate 50 is controlled by valve stem 32. The valve stem 32 is rotatable but vertically fixed with respect to valve body 10, the vertical position of the valve stem being secured by means of bearing retainer 36. The lower end portion 32A of the valve stem as seen in FIGS. 1 and 2 is externally threaded. Threadably received on this lower valve stem portion is an internally threaded lift nut 134, the lift nut having protrusions on the lower end (not seen in the drawings) that are received within notches 76 in top end 74 of first segment attachment portion 70.

Received on valve stem 32 and exteriorly of lift nut 134 and exteriorly of gate first segment attachment portion 70 is a tubular retainer 136. Tubular retainer 136 has a flange portion 136A at the top, the flange having an opening 138 therein that receives valve stem threaded portion 32A, the flange portion 136A resting on the top end of lift nut 134. Although not shown in FIGS. 1 and 2, at the lower end of tubular retainer 136 set screws are positioned to engage the lower circumferential recess 78 at the bottom of first segment attachment portion 70. Lift nut 134 and retainer 136 serve to vertically lift gate first segment 52 when valve stem 32 is rotated in one direction. When the stem is rotated in the opposite direction lift nut 134 forces gate first segment 52 downwardly.

Received within the lower portion of valve body cavity 20 is a skirt 140 that has semicircular recesses in the upper ends of the opposed sidewalls that extend about the lower half of the circumference of valve seats 38 and 42. The function of skirt 40 is to retain grease to provide lubrication to the lower portion of the gate as the gate is moved vertically within the valve.

FIG. 1 shows the gate valve in the open position. That is, gate 50 is in its upward position as lifted by rotation of valve stem 32. Upward lift causes second segment horizontal it, ledge 90 to engage the first segment horizontal ledge 66, thereby moving the second segment upward as a first segment is lifted by rotation of valve stem 32. In the open position passageways 68 and 88 in gate segments 52 and 54 are in alignment with passageways 40 and 44 in seats 38 and 42 which in turn are in alignment with passageways 12 and 14 in the valve body. Thus the valve is in the fully open position and fluid can flow unobstructively and with minimal turbulence through the valve. Further, when moved towards the upward position gate second segment 54 is slid in the downwardmost position relative to the gate first segment 52 so that spacing between the gate opposed sealing faces 56 and 80 is reduced to a minimum, allowing the gate to move with relatively little resistance to the fully open position.

To close the valve, stem 32 is rotated to cause threaded portion 32A to downwardly move lift nut 134, thereby threadably downwardly forcing gate first segment 52. Gate second segment 54 is carried downwardly as the first segment is forced downwardly by the frictional engagement between the inner surfaces thereof and by the force of cantilevered springs 96 and 98. When gate second segment 54 is in the fully downward position, the bottom end 84 engages the interior bottom of the valve body recess 20, or more specifically the interior bottom of skirt 140 as seen in FIG. 2, terminating the downward disposition of gate second segment 54. The first segment 52 can continue to move downwardly, the first segment inclined surface 62 sliding on the second segment incline surface 92, forcing the segments apart. That is specifically, forcing the spacing between sealing faces 56 and 80 further apart, thereby forcing sealing faces 56 and 80 into firm sealing contact with sealing faces 46 and 48 of valve seats 38 and 42. This firmly closes the valve. Passageway 40 through first valve seat 38 is securely closed by the secure engagement of sealing face 56 of gate first segment 52 against sealing face 46 of first valve seat 38. In like manner, flow through second valve seat 42 is secure closed by the engagement of gate second segment sealing face 80 against second valve seat sealing face 48.

The unique arrangement of the valve gate 50 is such that when the valve is moved from the closed toward the open position the opening torque requirement applied to rotate stem 32 is dramatically reduced compared to other types of gates since the gate immediately collapses in its total width as the gate first segment moves upwardly with respect to the gate second segment. Thus the unique gate arrangement provides for securely closing the valve against the fluid flow when in the closed position but provides for substantial reduced stock on valve stem 32 to move the valve from the closed to the open position compared with other types of gate valves.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An improved gate for use in a valve of the type having a body with a vertically oriented body cavity therein and horizontal inlet and outlet fluid flow passageways communicating with said body cavity, the valve having a vertical stem intercepting said body cavity and having a first and a second opposed valve seat within said body cavity the seats surrounding respectively said fluid flow passageways, said gate comprising;

a first generally rectangular vertical segment having an outer, substantially planar first segment sealing face, a bottom end and an inner surface divided by a first segment horizontal ledge, a top portion of said first segment inner surface above said ledge being inclined upwardly and outwardly with respect to said first segment sealing face, the first segment being attachable for vertical displacement by the valve stem; and a second generally rectangular vertical segment having an outer, substantially planar second segment sealing face, a top end, a bottom end and an inner surfaced divided by a horizontal second segment ledge, the second segment inner surface top portion above said second segment ledge being inclined upwardly and inwardly with respect to said second segment sealing face, the second segment being mated with and moved by said first segment with the first segment ledge contracting said second segment ledge when said first segment is moved in upward direction, by which the second segment is vertically moved, the segments being forced apart by sliding relationship of said inclined surfaces as said first segment is downwardly displaced by said stem to force said first segment sealing face into sealed contact with said first valve seat and said second segment sealing face into sealed contact with said second valve seat to close said fluid flow through the valve.

2. An improved gate valve according to claim 1 wherein said bottom surface of said second segment is spaced a greater distance from said second segment ledge than said bottom surface of said first segment is spaced from said first segment ledge whereby said second segment is forced upwardly relative to said first segment as said gate is moved downwardly against a valve body lower interior surface.

3. An improved gate valve according to claim 1 wherein said second segment is vertically free floating except as positioned by said first segment.

4. An improved gate valve according to claim 1 including a spring system resiliently urging said first and second segments towards each other.

5. An improved gate valve according to claim 4 wherein each of said first and second segments has opposed sides and wherein said spring system is in the form of a first and a second elongated cantilevered spring each having a fixed end and a free end, said fixed ends of said springs being secured to opposed sides of one of said gate segments and said free ends of said springs engaging pins extending from opposed sides of the other of said gate segments.

6. An improved gate valve according to claim 5 wherein each of said cantilevered springs has, adjacent said free end thereof, an integral hook portion that engages said pin in each side of one of said gate segments when said gate segments, having said fixed ends of said cantilevered springs secured to said gate segment, is displaced in an upward direction.

7. An improved gate valve comprising:

a body having horizontal inlet and outlet fluid flow passageways therethrough that perpendicularly intersect a body cavity;

a first and an opposed second seat supported in said body cavity and surrounding respectively said inlet and outlet fluid flow passageways;

a vertical stem supported in a vertical plane by said body and extending into said body cavity; and a gate positioned within said body cavity between said seats and being vertically displaceable by said stem between an upper valve open position and a downward valve closed position, the gate being formed by a first and a second segment, each segment having an internal face inclined at an angle to said vertical plane and an outer planar sealing face, the outer sealing faces being parallel to each other and to said vertical plane, each segment having in a lower portion an opening therethrough, the openings in said segments being aligned with said body fluid flow passageways when said gate is in said upper, open position and out of alignment with said body fluid flow passageways when the gate is in said lower, closed position, said inclined surfaces being vertically displaced with respect to each other when said gate is moved downwardly to said closed position forcing said segments outer sealing faces away from each other and into sealed engagement with said seats, closing flow through said fluid flow passageways and said inclined surfaces being vertically displaced with respect to each other when said gate is moved upwardly to said open position allowing said segments outer sealing faces to move toward each other thereby reducing the force required to move the gate to the open position, wherein said first segment has an outer, substantially planar first segment sealing face, a bottom end and an inner surface divided by a first segment horizontal ledge, a top portion of said first segment inner surface above said ledge being inclined upwardly and outwardly with respect to said first segment sealing face, the first segment being attachable for vertical displacement by the valve stem; and wherein said second segment has an outer, substantially planar second segment sealing face, a top end, a bottom end and an inner surface divided by a horizontal second segment ledge, the second segment inner surface top portion above said second segment ledge being inclined upwardly and inwardly with respect to said second segment sealing face, the second segment being mated with and moved by said first segment with the first segment ledge contacting said second segment ledge when said first segment is moved in an upward direction, by which the second segment is vertically moved, the segments being forced apart by sliding relationship of said inclined surfaces as said first segment is downwardly displaced by said stem to force said first segment sealing face into sealed contact with said first valve seat and said second segment sealing face into sealed contact with said second valve seat to close said fluid flow through the valve.

8. An improved gate valve according to claim 7 wherein said bottom surface of said second segment is spaced a greater distance from said second segment ledge than said bottom surface of said first segment is spaced from said first segment ledge whereby said second segment is forced upwardly relative to said first segment as said gate is moved downwardly against a valve body lower interior surface.

9. An improved gate valve according to claim 7 wherein said second segment is vertically free floating except as positioned by said first segment.

10. An improved gate valve according to claim 7 including a spring system resiliently urging said first and second segments towards each other.

11. An improved gate valve according to claim 5 wherein each of said first and second segments has opposed sides and wherein said spring system is in the form of a first and a second elongated cantilevered spring each having a fixed end and a free end, said fixed ends of said springs being secured to opposed sides of one of said gate segments and said free ends of said springs engaging pins extending from opposed sides of the other of said gate segments.

12. An improved gate valve according to claim 11 wherein each of said cantilevered springs has, adjacent said free end thereof, an integral hook portion that engages said pin in each side of one of said gate segments when said gate segment having said fixed ends of said cantilevered springs secured to it is displaced in an upward direction.

13. An improved gate valve comprising:

a body having horizontal inlet and outlet fluid flow passageways therethrough that perpendicularly intersect a body cavity;

a first and an opposed second seat supported in said body cavity and surrounding respectively said inlet and outlet fluid flow passageways;

a vertical stem supported in a vertical plane by said body and extending into said body cavity; and a gate positioned within said body cavity between said seats and being vertically displaceable by said stem between an upper valve open position and a downward valve closed position, the gate being formed by a first and a second segment, each segment having an internal face divided into an upper portion and a lower portion, the upper portion of the internal faces of each segment being inclined at an angle to said vertical plane and each segment having an outer planar sealing face, the outer sealing faces being parallel to each other and to said vertical plane, each segment having in said lower portion an opening therethrough, the openings in said segments being aligned with said body fluid flow passageways when said gate is in said upper, open position and out of alignment with said body fluid flow passageways when the gate is in said lower, closed position, said inclined surfaces being vertically displaced with respect to each other forcing said segments outer sealing faces away from each other and into sealed engagement with said seats, closing flow through said fluid flow passageways only when said gate is moved downwardly to said closed position and said inclined surfaces being vertically displaced with respect to each other allowing said segments outer sealing faces to move toward each other only when said gate is moved upwardly toward said open position thereby reducing the force required to move the gate to the open position.

\* \* \* \* \*